United States Patent Office 2,731,459
Patented Jan. 17, 1956

2,731,459
TRISAZO-DYESTUFFS

Raymond Gunst, Binningen, Switzerland, assignor to Ciba Limited, Basel, Switzerland, a Swiss firm No Drawing. Application May 19, 1952, Serial No. 288,753

Claims priority, application Switzerland June 25, 1951

7 Claims. (Cl. 260—171)

The present invention provides new trisazo-dyestuffs, for example, the dyestuff of the formula (1) 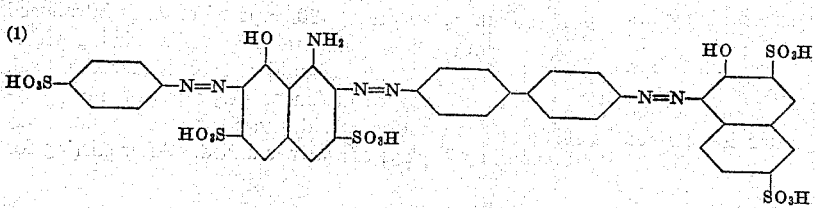 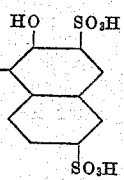

which correspond to the general formula (2) 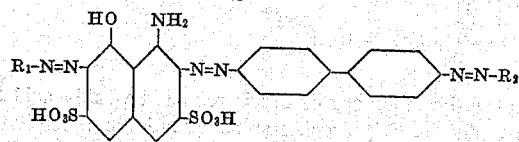

in which $R_1$ represents an aromatic radical of the benzene series, and $R_2$ represents a hydroxynaphthalene radical, each of the radicals $R_1$ and $R_2$ containing at least one sulfonic acid group, the radical $R_2$ being free from substituents apart from the hydroxyl group and the sulfonic acid group or groups, and the two radicals $R_1$ and $R_2$ together containing at least three sulfonic acid groups.

These dyestuffs can be made by coupling a diazo-azo-compound of the formula (3) 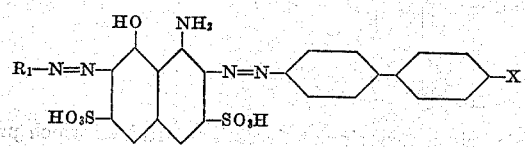

in which $R_1$ represents an aromatic radical of the benzene series containing at least one sulfonic acid group, and X represents a diazotized amino group, with a hydroxynaphthalene sulfonic acid free from substituents other than the hydroxyl group and the sulfonic acid group or groups, and by so choosing the starting materials that the total number of sulfonic acid groups present in the radical $R_1$ and in the hydroxynaphthalene sulfonic acid is at least three.

The diazo-azo-compounds of the Formula 3, certain of which are known, can be made by coupling tetrazotized 4:4′-diaminodiphenyl in an acid medium on one side with 1-amino-8-hydroxynaphthalene-3:6-disulfonic acid, and then coupling the resulting compound in an alkaline medium with the diazo compound of an amine of the formula $R_1$—$NH_2$, in which $R_1$ has the meaning given above.

As amines of the formula $R_1$—$NH_2$ there come into consideration aniline sulfonic acids such as aniline-2- or -3- or especially -4-sulfonic acid, or aniline disulfonic acids such as aniline-3:5- or -2:5-disulfonic acid.

Coupling of the tetrazotized 4:4′-diaminodiphenyl with the 1-amino-8-hydroxynaphthalene-3:6-disulfonic acid is carried out in an acid medium, advantageously a medium rendered acid with a mineral acid. For coupling the resulting diazo-monoazo-compound with the diazo compound of the amine of the formula R—$NH_2$ in an alkaline medium there is advantageously used a medium rendered alkaline with an alkali carbonate.

As will be apparent from what has been stated above, there may be used as starting materials hydroxynaphthalene monosulfonic acids, provided that the radical $R_1$ of the diazo-azo-compound contains two sulfonic acid groups. If, however, the latter radical contains only a single sulfonic acid group it is necessary to use as a coupling component a hydroxynaphthalene sulfonic acid containing at least two sulfonic acid groups. Taking into account what has been stated above there come into consideration as hydroxynaphthalene sulfonic acids, for example, 1-hydroxynaphthalene-4- or -5-sulfonic acid,
2-hydroxynaphthalene-6- or -7-sulfonic acid,
1-hydroxynaphthalene-3:6-, -3:8- or -4:8-disulfonic acid, and
2-hydroxynaphthalene-3:6- or -3:8-disulfonic acid.

The coupling of the diazo-azo-compounds of the Formula 3 with the hydroxynaphthalene sulfonic acids is advantageously carried out in an alkaline medium.

The dyestuffs of the invention are new and correspond to the above Formula 2. As follows from the above explanations, these dyestuffs contain at least five and preferably not more than six sulfonic acid groups. Especially valuable products are the dyestuffs containing five sulfonic acid groups, for example, those which contain a single sulfonic acid group in the radical $R_1$ and two sulfonic acid groups in the radical $R_2$. The dyestuffs of the Formula 2 are principally suitable for dyeing chrome-tanned leather, especially velour leather (suede). The dyeings are distinguished by their good fastness to light and also by their especially desirable navy blue tints, and by the fact that as compared with leather dyestuffs of similar constitution they do not exhibit the bronzing effect which frequently occurs and is very undesirable. Moreover, the dyestuffs possess the advantage that the coupling components (hydroxynaphthalene sulfonic acids) required in making them are easily accessible compounds.

The following examples illustrate the invention, the parts and percentages being by weight:

Example 1

19 parts of 4:4′-diaminodiphenyl are tetrazotized in known manner. Into the tetrazo solution there is introduced dropwise in the course of 1 hour a clear solution of 34.1 parts of 1-amino-8-hydroxynaphthalene-3:6-disulfonic acid in 300 parts of water, with solution has a pH value of 5.6. The temperature ranges from 10–15° C. By slowly introducing dropwise a dilute aqueous solution of sodium carbonate the mineral acid set free during coupling is neutralized, but the reaction of the mixture must be maintained distinctly acid to Congo throughout. After 12 hours, there is run in at 50° C. a diazonium solution prepared from 17.3 parts of 1-aminobenzene-4-sulfonic acid, and a solution of 26 parts of sodium carbonate in 120 parts of water is poured into the coupling mixture rapidly, while stirring vigorously. The pH value must not be higher than 8.5. After 30 minutes there is added a solution of 30.4 parts of 2-hydroxynaphthalene-3:6-disulfonic acid and 5 parts of sodium carbonate in 150 parts of water. After stirring for 2 hours the reaction mixture is rendered weakly acid by the addition of hydrochloric acid, the precipitated dyestuff of the formula

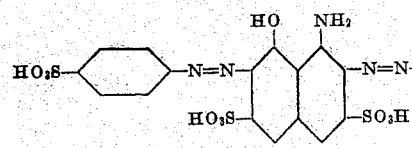

is separated by filtration and dried. The resulting black powder dissolves easily in water, and dyes chrome tanned leather, especially velour leather, reddish navy blue tints.

By using for the last coupling 1-hydroxynaphthalene-3:6-disulfonic acid, instead of 2-hydroxynaphthalene-3:6-disulfonic acid, a very similar dyestuff is obtained which corresponds to the formula

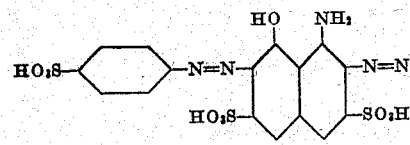

*Example 2*

By the procedure described in Example 1 an intermediate compound is prepared from 4:4'-diaminodiphenyl and 1-amino-8-hydroxynaphthalene-3:6-disulfonic acid and coupled with 1-diazobenzene-4-sulfonic acid. In a manner analogous to that described in Example 1 the product is finally coupled with 1-hydroxynaphthalene-4:8-disulfonic acid. The dyestuff so obtained corresponds to the formula

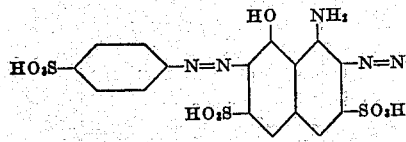

It is of excellent solubility, and dyes velour leather handsome navy blue tints.

A similar dyestuff of excellent solubility is obtained by using, instead of 1-aminobenzene-4-sulfonic acid, an equivalent quantity of 1-aminobenzene-2:5-disulfonic acid or 1-aminobenzene-3:5-disulfonic acid.

By using instead of 1-hydroxynaphthalene-4:8-disulfonic acid, 2-hydroxynaphthalene-6:8-disulfonic acid a similar dyestuff is obtained, which corresponds to the formula

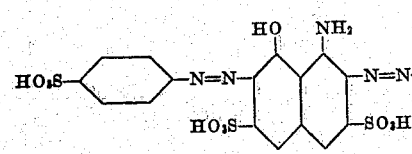

and yields somewhat more greenish navy blue tints on velour leather.

*Example 3*

19 parts of 4:4'-diaminodiphenyl are tetrazotized in known manner. A clear solution of 34.1 parts of 1-amino-8-hydroxynaphthalene-3:6-disulfonic acid in 300 parts of water, having a pH value of 5.6, is introduced dropwise into the tetrazo-solution in the course of one hour. The temperature is 10–15° C. By slowly introducing dropwise a dilute aqueous solution of sodium carbonate the mineral acid liberated during coupling is neutralized so as to maintain the reaction of the mixture distinctly acid to Congo. After 12 hours, a diazonium solution prepared from 25.3 parts of 1-aminobenzene-2:5-disulfonic acid is run in at 5° C., and a solution of 26 parts

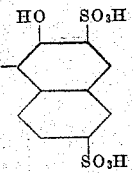

of sodium carbonate in 120 parts of water is introduced rapidly into the coupling mixture while stirring vigorously. The pH value should not be higher than 8.5. After 30 minutes a solution of 22.4 parts of 2-hydroxynaphthalene-6-sulfonic acid and 5 parts of sodium carbonate in 150 parts of water is added. After stirring for

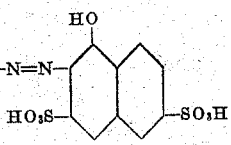

2 hours the reaction mixture is rendered weakly acid by the addition of hydrochloric acid, and the precipitated dyestuff is separated by filtration and dried. The black powder so obtained dissolves easily in water and dyes chrome tanned leather, especially velour leather, full navy blue tints.

By using instead of 2-hydroxynaphthalene-6-sulfonic acid in the final coupling, 1-hydroxynaphthalene-4-sulfonic acid a very similar dyestuff is obtained which produces on chrome leather somewhat more reddish dyeings.

*Example 4*

100 parts of well fulled velour leather are worked in a dyeing vessel with 8 times the amount of water at 60° C. 5 parts of the dyestuff obtainable as described in the first paragraph of Example 1 dissolved in 50 parts of water are added, and dyeing is carried on for one hour. Fixation is carried out by the addition of 5 parts of formic acid to

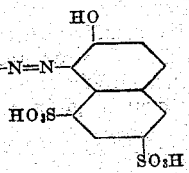

the dye liquor and the leather is worked for a further 30 minutes. The quantities are calculated on the dry weight of the leather. There is obtained a full reddish navy blue dyeing.

What is claimed is:

1. A trisazo-dyestuff which corresponds to the formula

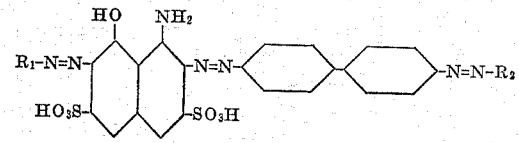

in which $R_1$ represents a benzene radical, $R_2$ represents the radical of a mono-hydroxynaphthalene, each of the radicals $R_1$ and $R_2$ contains at least one sulfonic acid group, the two radicals $R_1$ and $R_2$ together contain at least three sulfonic acid groups, and the hydroxy group and sulfonic acid groups are the single substituents present in the radical $R_2$.

2. A trisazo-dyestuff which corresponds to the formula

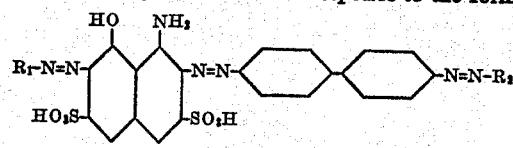

in which $R_1$ represents a benzene radical substituted by $m$ sulfonic acid groups and $R_2$ represents an aromatic radical of the naphthalene series of the composition

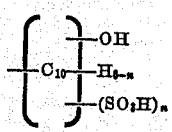

$m$ and $n$ each representing a whole number of at most 2 and the sum $m+n$ being at least 3 and at the most 4.

3. A trisazo-dyestuff which corresponds to the formula

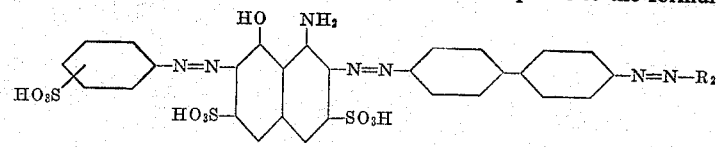

in which $R_2$ represents an aromatic radical of the naphthalene series of the composition

4. A trisazo-dyestuff which corresponds to the formula

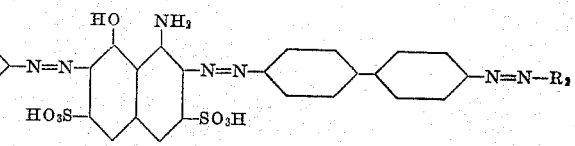

in which $R_2$ represents an aromatic radical of the naphthalene series of the composition

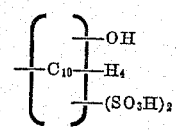

5. The trisazo-dyestuff which corresponds to the formula

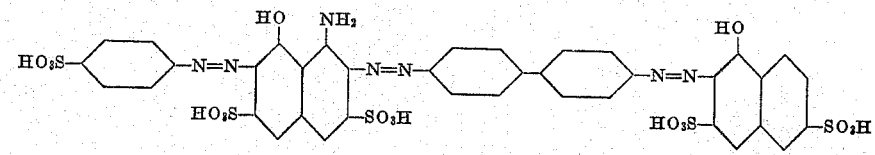

6. The trisazo-dyestuff which corresponds to the formula

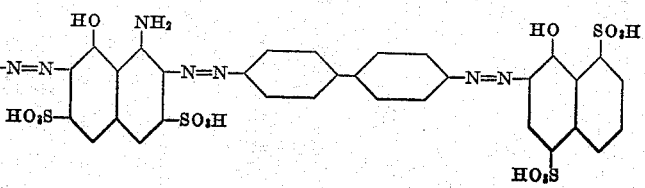

7. The trisazo-dyestuff which corresponds to the formula

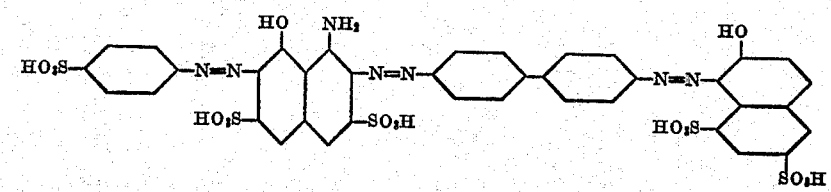

References Cited in the file of this patent

UNITED STATES PATENTS

| | | |
|---|---|---|
| 2,073,000 | Clingestein et al. | Mar. 9, 1937 |
| 2,157,295 | Lier | May 9, 1939 |

FOREIGN PATENTS

| | | |
|---|---|---|
| 153,557 | Germany | Apr. 2, 1901 |